US009524128B2

(12) United States Patent
Sweet (10) Patent No.: US 9,524,128 B2
(45) Date of Patent: Dec. 20, 2016

(54) INFORMATION SECURITY FOR PRINTING SYSTEMS

(75) Inventor: Michael R. Sweet, Morgan Hill, CA (US)

(73) Assignee: Apple Inc., Cupertino, CA (US)

( * ) Notice: Subject to any disclaimer, the term of this patent is extended or adjusted under 35 U.S.C. 154(b) by 1090 days.

(21) Appl. No.: 13/153,212

(22) Filed: Jun. 3, 2011

(65) Prior Publication Data
US 2012/0307281 A1    Dec. 6, 2012

(51) Int. Cl.
*G06F 3/12* (2006.01)
*H04L 29/06* (2006.01)
*G06F 21/60* (2013.01)
*G06F 21/62* (2013.01)

(52) U.S. Cl.
CPC .......... *G06F 3/1222* (2013.01); *G06F 3/1273* (2013.01); *G06F 3/1288* (2013.01); *G06F 21/608* (2013.01); *G06F 21/6218* (2013.01); *H04L 63/102* (2013.01); *G06F 2221/2117* (2013.01); *G06F 2221/2141* (2013.01); *G06F 2221/2149* (2013.01)

(58) Field of Classification Search
CPC .... G06F 3/1222; G06F 3/1273; G06F 3/1288; G06F 21/6218; G06F 21/608; G06F 2221/2141; G06F 2221/2117; G06F 2221/2149; H04L 63/102
See application file for complete search history.

(56) References Cited

U.S. PATENT DOCUMENTS

| | | | | |
|---|---|---|---|---|
| 6,004,276 A * | 12/1999 | Wright | ................. | G06F 19/322 128/923 |
| 6,202,092 B1 * | 3/2001 | Takimoto | ................ | G06F 21/84 358/1.13 |
| 6,421,716 B1 * | 7/2002 | Eldridge | ........... | G06F 17/30011 455/433 |
| 6,535,932 B1 * | 3/2003 | Endoh | .................. | G06F 3/1204 710/7 |
| 6,615,258 B1 * | 9/2003 | Barry | ................. | G06F 11/0709 707/E17.107 |
| 7,130,066 B1 * | 10/2006 | Kanematu | ............. | H04L 63/083 358/1.14 |
| 7,225,249 B1 * | 5/2007 | Barry | ................. | G06F 17/3089 709/227 |
| 7,454,796 B2 * | 11/2008 | Mazzagatte | ........... | G06F 3/1204 726/17 |
| 7,613,412 B2 * | 11/2009 | Harada | ................. | G06F 21/608 399/80 |
| 7,664,956 B2 * | 2/2010 | Goodman | ............. | G06F 17/211 380/201 |

(Continued)

*Primary Examiner* — Tammy Paige Goddard
*Assistant Examiner* — Walter Yehl
(74) *Attorney, Agent, or Firm* — Blank Rome LLP (57) ABSTRACT

The disclosed embodiments provide a system for managing use of a printing system. During operation, the system obtains a request for print job information associated with the printing system and/or subscription information associated with subscriptions to events in the printing system. Next, the system obtains an access control policy associated with the request. The system then filters the print job and/or subscription information based on the access control policy and responds to the request with the filtered print job and/or subscription information. As a result, the system may facilitate information security in the printing system.

16 Claims, 7 Drawing Sheets

(56) References Cited

U.S. PATENT DOCUMENTS

| | | | |
|---|---|---|---|
| 7,890,350 B1* | 2/2011 | Fiedotin | G06F 19/3418 600/300 |
| 2002/0062453 A1* | 5/2002 | Koga | G06F 21/608 726/32 |
| 2003/0167336 A1* | 9/2003 | Iwamoto | G06F 21/604 709/229 |
| 2005/0216421 A1* | 9/2005 | Barry | G06F 11/0709 705/64 |
| 2005/0243364 A1* | 11/2005 | Sakai | G06F 21/608 358/1.15 |
| 2006/0112021 A1* | 5/2006 | Maki | B41J 2/0458 705/67 |
| 2006/0206860 A1* | 9/2006 | Dardinski | G05B 15/02 717/105 |
| 2007/0061374 A1* | 3/2007 | Inakawa | G06K 15/002 |
| 2007/0067680 A1* | 3/2007 | Harada | G06F 21/608 714/45 |
| 2008/0043256 A1* | 2/2008 | Broda | G06F 17/211 358/1.3 |
| 2009/0009802 A1* | 1/2009 | Shaw | G06F 21/608 358/1.15 |

\* cited by examiner

| Print Job Attribute | Administrator | Non-Administrator |
|---|---|---|
| Name/Title | Allowed | Denied |
| Size | Allowed | Denied |
| Number of Pages | Allowed | Denied |
| Owner | Allowed | Denied |
| Job Options | Allowed | Denied |
| Time of Creation | Allowed | Allowed |
| Time of Processing | Allowed | Allowed |
| Time of Completion | Allowed | Allowed |
| State | Allowed | Allowed |
| Hold Time | Allowed | Denied |
| Destination | Allowed | Denied |
| ID | Allowed | Allowed |

FIG. 3

| Subscription Attribute | Administrator | Non-Administrator |
|---|---|---|
| ID | Allowed | Allowed |
| Owner | Allowed | Denied |
| Events | Allowed | Denied |
| Poll Method | Allowed | Denied |
| Recipient | Allowed | Denied |
| Creation Time | Allowed | Allowed |
| Destination | Allowed | Denied |
| Job ID | Allowed | Denied |
| Notification Attributes | Allowed | Denied |
| Preferred Language | Allowed | Denied |
| Lease Time | Allowed | Denied |

INFORMATION SECURITY FOR PRINTING SYSTEMS

BACKGROUND

Field

The present embodiments relate to printers for computer systems. More specifically, the present embodiments relate to techniques for providing information security for printing systems.

Related Art

Printing may facilitate numerous aspects of an organization's activities. For example, documents may be printed within the organization for design, marketing, accounting, review, recordkeeping, planning, and/or notification purposes. However, significant costs may be incurred by the organization in implementing and providing print technology, including costs associated with the purchase of printing hardware and supplies as well as costs associated with maintenance and configuration of computers and printers within the organization's printing infrastructure.

In addition, the widespread use of a printing infrastructure within an organization may result in a number of information security and/or privacy issues. For example, a user may obtain a list of print jobs and/or subscriptions to events in the printing infrastructure from a print server. However, the list of print jobs may contain sensitive information, such as file names and file sizes associated with the print jobs, users to which the print jobs belong, and/or the printers to which the print jobs are assigned. Similarly, the list of subscriptions to events may include information regarding the owners of the subscriptions and the types events subscribed to (e.g., monitored) by the owners. As a result, unrestricted access to information from printing infrastructures may constitute a breach of confidentiality within organizations providing the printing infrastructures.

SUMMARY

The disclosed embodiments provide a system for managing use of a printing system. During operation, the system obtains a request for print job information associated with the printing system and/or subscription information associated with subscriptions to events in the printing system. Next, the system obtains an access control policy associated with the request. The system then filters the print job and/or subscription information based on the access control policy and responds to the request with the filtered print job and/or subscription information. As a result, the system may facilitate information security in the printing system.

In some embodiments, obtaining the access control policy associated with the request involves verifying a user associated with the request, and obtaining the access control policy as a set of permissions associated with the user. For example, the access control policy may be obtained based on a username, a user identifier (UID), a role, and/or a password for the user.

In some embodiments, the access control policy is associated with unrestricted access to the print job and/or subscription information if the role corresponds to an administrator role and restricted access to the print job and/or subscription information if the role corresponds to a non-administrator role. The unrestricted access may allow users in the administrator role to effectively manage the printing system, while the restricted access may prevent users in the non-administrator role from accessing sensitive and/or private data in the print job and/or subscription information.

In some embodiments, filtering the print job and/or subscription information based on the access control policy involves obtaining a set of restricted print job and/or subscription attributes from the access control policy, and excluding the restricted print job and/or subscription attributes from the print job and/or subscription information.

In some embodiments, the print job information includes a name, a size, a number of pages, an owner, one or more job options, a time of creation, a time of processing, a time of completion, a state, a hold time, a job identifier (ID), and/or a destination.

In some embodiments, the subscription information includes a subscription identifier (ID), an owner, one or more event types, a poll method, a recipient, a creation time, a destination, one or more notification attributes, a preferred language, and/or a lease time. In addition, each of the event types may be associated with at least one of a printer, a print job, and a print server.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
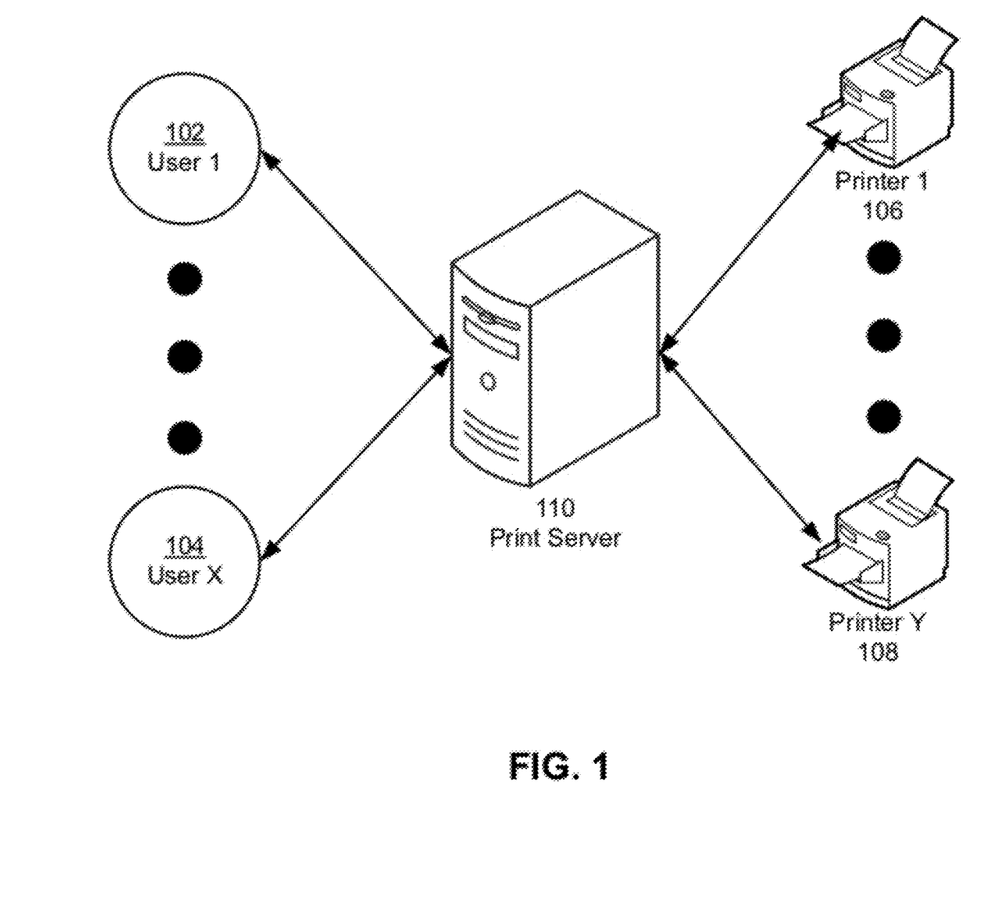
FIG. 1 shows a printing system in accordance with an embodiment.

The disclosed embodiments provide a method and system for managing use of a printing system. As shown in FIG. 1, the printing system includes a print server 110 and one or more printers (e.g., printer 1 106, printer y 108) connected to print server 110. The printers may correspond to network printers that are connected to print server 110 using a wired or wireless network connection. Alternatively, one or more printers may connect to print server 110 and/or other print servers in the printing system as local peripherals using one or more printer cables and/or one or more ports (e.g., parallel ports, serial ports, Universal Serial Bus (USB) ports).

Print server 110 may process and configure requests for print jobs from one or more users (e.g., user 1 102, user x 104). The users may be associated with access rights to one or more printers connected to print server 110. For example, the users may correspond to members of an organization (e.g., business, school, company, etc.) with user accounts that enable use of one or more printers connected to print server 110.

Upon receiving a request for a print job, print server 110 may send the request to the appropriate printer, which executes the print job using settings provided by the user requesting the print job. For example, the user may select a document to be printed and one or more job options associated with printing the document. The job options may include a number of copies, a number of printing sides (e.g., single- or double-sided), collation, stapling, an ink type (e.g., black-and-white, color), a paper size (e.g., A4, letter), a paper type (e.g., glossy, matte, bond, colored), a page orientation, a hold time (e.g., one hour, indefinitely), and/or a printing range (e.g., page range, selection).

Print server 110 may additionally process requests from the users for information associated with the printing system. The requested information may include print job information associated with one or more printers in the printing system. For example, a user with a pending print job may request a list of print jobs from print server 110 to ascertain the status and/or position of his/her print job with respect to other print jobs in the list.

The requested information may also include subscription information associated with subscriptions to events in the printing system. The subscription information may define active subscriptions to events in the printing system. For example, the subscription information may be stored in a "subscription.conf" file that defines a set of subscriptions to events in a Common Unix Printing System (CUPS) provided by print server 110. In turn, the contents of the "subscription.conf" file may be requested by a user if the user is unable to create a new subscription within the printing system.

However, print job and/or subscription information in the printing system may contain sensitive and/or private information, to which unrestricted and/or unauthorized access may constitute an information security breach. For example, the print job information may identify the files to be printed in pending print jobs, the users to which the pending print jobs belong, and/or the printers to which the pending print jobs are assigned. Similarly, the subscription information may identify the types of events associated with each subscription, the owner of the subscription, and/or printers or print jobs monitored by the subscription. As a result, a user may inadvertently and/or deliberately gain access to data related to the printing and/or monitoring behavior of other users by obtaining print job and/or subscription information from the printing system.

In one or more embodiments, print server 110 and/or other components in the printing system include functionality to facilitate information security in the printing system by filtering print job and/or subscription information prior to responding to user requests for the print job and/or subscription information. As discussed in further detail below with respect to FIG. 2, print server 110 and/or the other components may obtain an access control policy associated with each request. The access control policy may be obtained as a set of permissions (e.g., access rights) associated with the user from which the request was received.

To filter the print job and/or subscription information, a set of restricted print job and/or subscription attributes may be obtained from the access control policy and excluded from the print job and/or subscription information. The filtered print job and/or subscription information may then be used to respond to the request. Because sensitive and/or private data may be omitted from the filtered print job and/or subscription information, the filtered print job and/or subscription information may facilitate use of the printing system by the user without breaching the confidentiality of the sensitive and/or private data.

Figure 2:
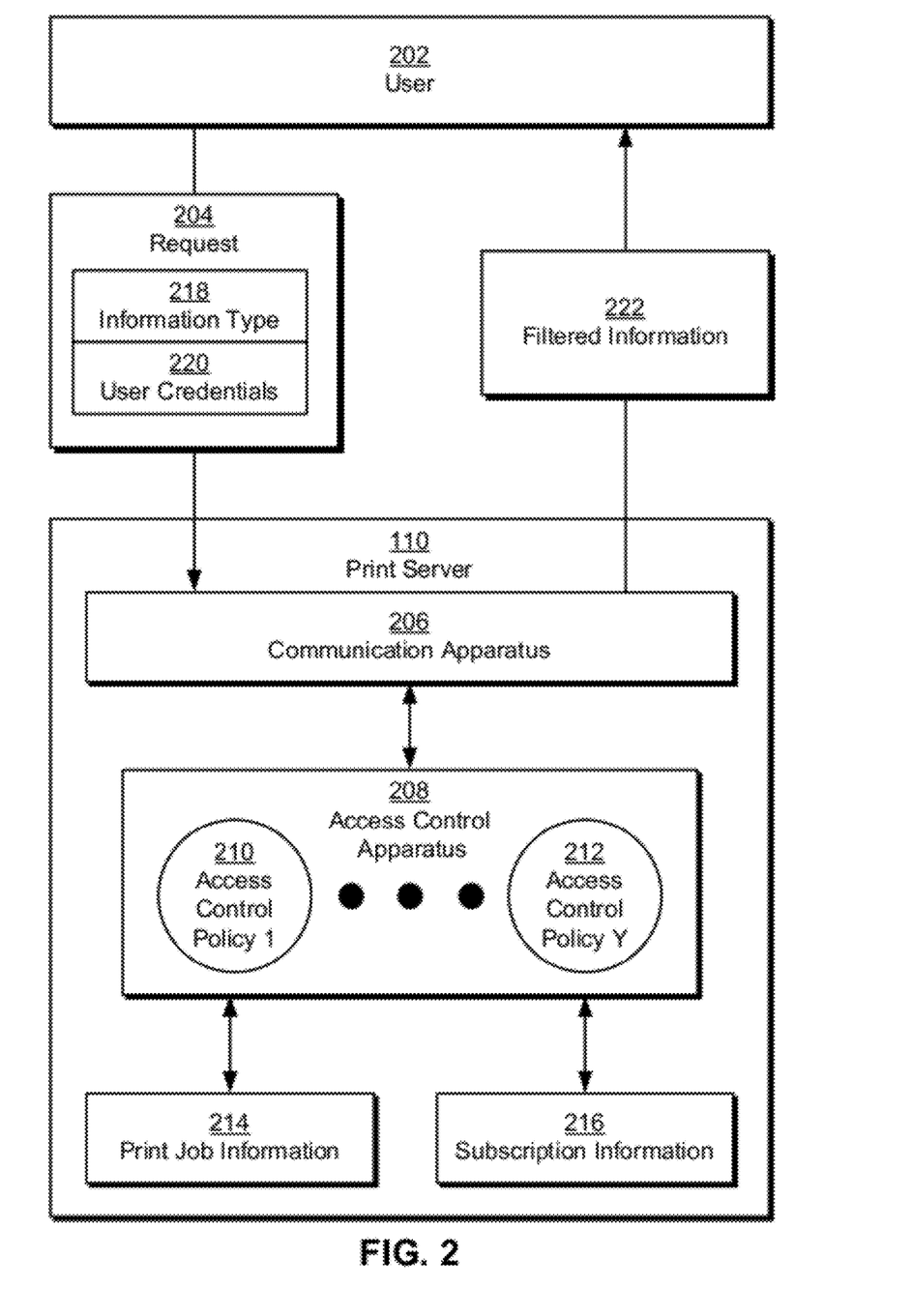
FIG. 2 shows a system for managing use of a printing system in accordance with an embodiment.

FIG. 2 shows a system for managing use of a printing system in accordance with an embodiment. As described above, the system may be provided by print server 110 and/or other components (e.g., computer systems, print servers) associated with the printing system. In addition, the system may include a communication apparatus 206 and an access control apparatus 208. Each of these components is described in further detail below.

Communication apparatus 206 may include functionality to communicate with a user 202 of the printing system. For example, communication apparatus 206 may include functionality to communicate with user 202 using HyperText Transfer Protocol (HTTP), Internet Printing Protocol (IPP), Line Printer Daemon (LPD) protocol, and/or another network protocol associated with communication in a printing system.

More specifically, communication apparatus 206 may obtain a request 204 for information from user 202. As shown in FIG. 2, request 204 may include an information type 218 and one or more user credentials 220. Information type 218 may describe the type of information (e.g., print job information 214, subscription information 216) requested by the user. For example, information type 218 may specify a request for print job information 214 in the form of a "Get-Jobs" and/or "Get-Jobs-Attributes" operation in request 204. Alternatively, information type 218 may specify a request for subscription information 216 in the form of a "Get-Subscriptions" and/or "Get-Subscription-Attributes" operation in request 204. In other words, information retrieved by print server 110 in response to request 204 may be based on information type 218 in request 204.

User credentials 220 may be used to verify the identity of user 202. For example, user credentials 220 may include a username, user identifier (UID), and/or password for user 202. Moreover, user credentials 220 may be provided with information type 218 and/or after information type 218 is received by print server 110. For example, request 204 may include a "Get-Jobs" operation that is submitted to print server 110 along with a UID for user 202. Because the "Get-Jobs" operation is associated with the retrieval of potentially sensitive and/or private information (e.g., print job information 214), user 202 may be prompted to enter his/her username and/or password to verify his/her identity and/or right to access information associated with the "Get-Jobs" operation prior to obtaining the information.

Next, access control apparatus 208 may use user credentials 220 to obtain an access control policy (e.g., access control policy 1 210, access control policy y 212) as a set of permissions associated with user 202. In one or more embodiments, access control apparatus 208 obtains the access policy based on a role associated with user 202. For example, the username and/or UID of the user may associate user 202 with an administrator role or a non-administrator role within the printing system. If the role corresponds to the administrator role, the access control policy may be associated with unrestricted access to print job information 214 and/or subscription information 216. On the other hand, if the role corresponds to the non-administrator role, the access control policy may be associated with restricted access to print job information 214 and/or subscription information 216. Note that there can exist other types of roles, such as an "operator role," which has access to certain private values, just like the administrator role, but does not have all of the capabilities of an administrator role. For example, an operator role can provide access to a limited set of administrator operations and attributes, so for example the operator may be able to see the number of pages in a document and the various job ticket values (print settings) but not the job name/title.

After the access control policy is obtained, access control apparatus 208 may obtain a set of restricted print job and/or subscription attributes from the access control policy. For example, the restricted print job and/or subscription attributes may correspond to attributes to which the user is denied access, according to the set of permissions for the user from the access policy.

Access control apparatus 208 may then filter the requested information by excluding the restricted print job and/or subscription attributes from print job information 214 and/or subscription information 216. For example, access control apparatus 208 may filter the requested information by retrieving print job information 214 and/or subscription information 216 from a database and/or other data-management mechanism and removing the restricted print job and/or subscription attributes from the requested information. Alternatively, access control apparatus 208 may query the database and/or data-management mechanism for only the print job and/or subscription attributes to which the user has access. Filtering of print job information 214 is discussed in further detail below with respect to FIG. 3, and filtering of subscription information 216 is discussed in further detail below with respect to FIG. 4.

After print job information 214 and/or subscription information 216 are filtered by access control apparatus 208, communication apparatus 206 may respond to request 204 using filtered information 222 obtained from access control apparatus 208. For example, communication apparatus 206 may respond to a "Get-Jobs" operation from a non-administrator user 202 with a list of print job attributes for pending print jobs in the printing system, including a set of masked and/or hidden print job attributes corresponding to print job attributes that are not accessible by user 202.

Those skilled in the art will appreciate that the system of FIG. 2 may implement access control to print job information 214 and subscription information 216 in a variety of ways. For example, access control apparatus 208 may include functionality to create and enforce different access control policies for a variety of user roles and/or security levels in the printing system. Access control apparatus 208 may also specify permissions using different kinds of access control policies, such as discretionary access control (DAC) policies, mandatory access control (MAC) policies, and/or role-based access control (RBAC) policies. Furthermore, access control apparatus 208 may regulate access to print job information 214 and subscription information 216 by maintaining a separate access control list for each printer and/or user (e.g., user 202) in the printing system. As a result, access control apparatus 208 may include functionality to vary the level of granularity and/or information security in the printing system using the access control policies.

Figure 3:
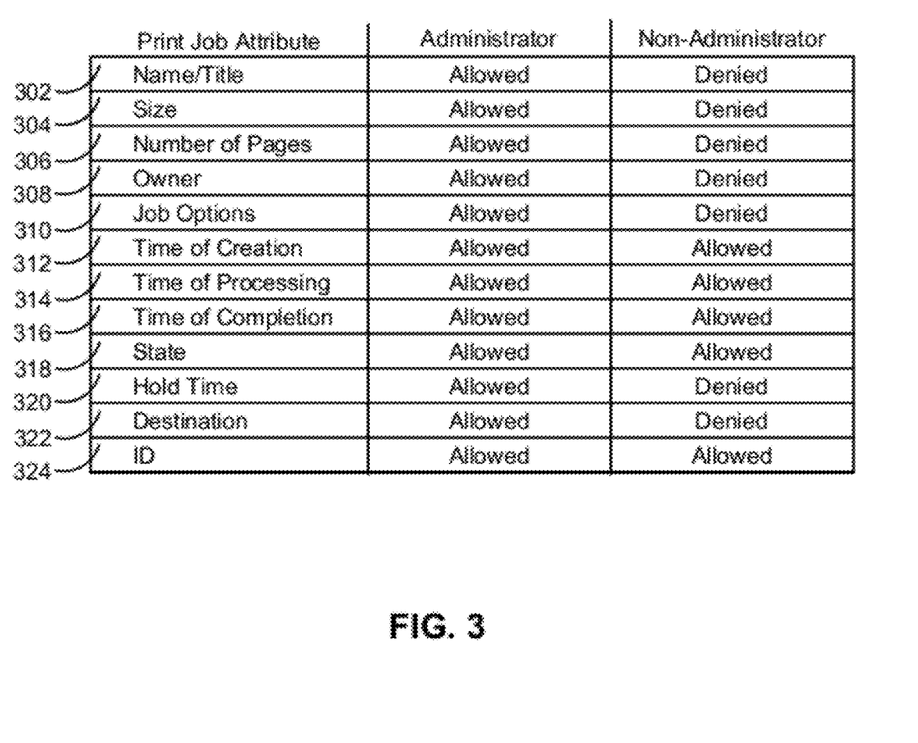
FIG. 3 shows an exemplary access control policy in accordance with an embodiment.

FIG. 3 shows an exemplary access control policy in accordance with an embodiment. In particular, the access control policy of FIG. 3 may correspond to an RBAC policy that includes a set of permissions 302-324 associated with print job information (e.g., print job information 214 of FIG. 2) in a printing system. Each permission 302-324 may be represented by three fields: a "Print Job Attribute" field specifying a print job attribute, an "Administrator" field representing access to the print job attribute from an administrator role in the printing system, and a "Non-Administrator" field corresponding to access to the print job attribute from a non-administrator role in the printing system.

As shown in FIG. 3, all permissions 302-324 are granted to the administrator role, while only permissions 312-318 and 324 are granted to the non-administrator role. Such differences in the granting of permissions 302-324 to administrators and non-administrators may facilitate use of the printing system by users respectively associated with the administrator and non-administrator roles, and at the same time, enforce information security in the printing system. For example, access to all print job attributes may be granted to the administrator role to allow administrators of the printing system to efficiently and/or effectively manage printers, print servers, and/or users in the printing system. Conversely, access to most print job attributes may be restricted in the non-administrator role to mitigate breaches of confidentiality within the printing system.

More specifically, the print job attributes associated with permissions 302-310 (e.g., "Name/Title," "Size," "Number of Pages," "Owner," "Job Options") may specify, for each print job, the file name of a file to be printed, the file size of the file, the number of pages to be printed, the owner of the print job, and job options associated with the print job. In addition, the print job attributes associated with permissions 320-322 (e.g., "Hold Time," "Destination") may describe hold times (e.g., one hour, indefinitely) associated with pending print jobs and/or printers for which the print jobs are destined. In other words, print job attributes associated with permissions 302-308 and 320-322 may contain sensitive and/or private data that should not be accessible to most users. As a result, the non-administrator role may be "denied" access to print job attributes associated with permissions 302-308 and 320-322 to prevent users that do not actively participate in the management of the printing system from inadvertently and/or deliberately acquiring knowledge of the printing activities of other users of the printing system.

Conversely, the print job attributes associated with permissions 312-318 and 324 (e.g., "Time of Creation," "Time of Processing," "Time of Completion," "State," "ID") may describe the times of creation, processing, and/or completion of print jobs, as well as the state (e.g., pending, processing, held, canceled, completed) and/or identifier (ID) of each print job. Print job attributes associated with permissions 312-318 and 324 may thus correspond to status and/or timing information associated with print jobs in the printing system. Consequently, both the administrator and non-administrator roles may be "allowed" access to the print job attributes associated with permissions 312-318 and 324 to enable use of the print job attributes in managing and using the printing system. For example, print job attributes associated with permissions 312-318 and 324 may allow a non-administrator user to assess the status of his/her print job with respect to other pending print jobs in the printing system.

As mentioned previously, the access control policy of FIG. 3 may be modified for use with different printing systems, roles, and/or print job attributes. For example, the access control policy may provide finer-grained access control by specifying permissions 302-324 for other roles in the printing system, such as "manager" or "supervisor." Access to information may also be increased or decreased within each role by granting or denying permissions 302-324 associated with the role. Similarly, a different access control policy may be created for each printer and/or location (e.g., building, campus) associated with the printing system. Finally, permissions 302-324 may be added to and/or removed from the access control policy based on the availability and/or use of print job attributes within the printing system.

Figure 4:
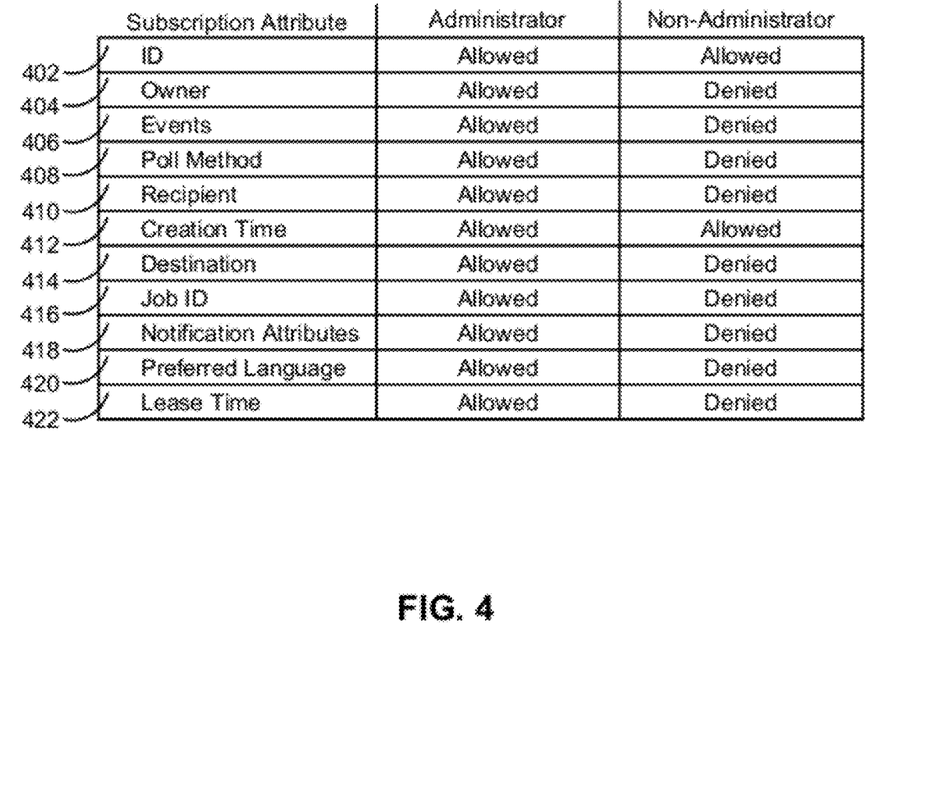
FIG. 4 shows an exemplary access control policy in accordance with an embodiment.

FIG. 4 shows an exemplary access control policy in accordance with an embodiment. More specifically, FIG. 4 shows a set of permissions 402-422 associated with subscription information (e.g., subscription information 216 of FIG. 2) in a printing system. Each permission 402-422 is associated with a "Subscription Attribute" field describing a subscription attribute, an "Administrator" field representing access to the subscription attribute from an administrator role in the printing system, and a "Non-Administrator" field specifying access to the subscription attribute from a non-administrator role in the printing system.

As with the access control policy of FIG. 3, the administrator role is associated with unrestricted access to all subscription attributes associated with permissions 402-422. Such unrestricted access may allow users in the administrator role to manage the creation, use, and/or deletion of subscriptions to events in the printing system. For example, subscription attributes associated with permissions 402-408 (e.g., "ID," "Owner," "Events," "Poll Method") may allow an administrator of the printing system to uniquely identify a subscription, the subscription's owner, the types of events (e.g., printer events, print job events, print server events) subscribed to by the subscription, and a poll method used to obtain the events. Next, subscription attributes associated with permissions 410-416 (e.g., "Recipient," "Creation Time," "Destination," "Job ID") may allow the administrator to identify the recipient (e.g., email address, web feed) of the subscription, the time at which the subscription was created, a destination (e.g., printer) associated with the subscription, and a print job associated with the subscription. Finally, subscription attributes associated with permissions 418-422 (e.g., "Notification Attributes," "Preferred Language," "Lease Time") may provide the administrator with information regarding a set of notification attributes (e.g., event details) obtained by the subscription, a preferred language for the subscription, and a duration and/or expiration of the subscription.

On the other hand, the non-administrator role may be associated with restricted access to most subscription attributes to prevent non-administrator users from accessing sensitive and/or private information associated with subscription to and/or monitoring of events in the printing system. Instead, the non-administrator role may only be granted access to status and/or timing information associated with permissions 402 and 412 to facilitate use of subscriptions by non-administrator users of the printing system. For example, a non-administrator user may be given access to a list of IDs and creation times of subscriptions in the printing system to allow the user to diagnose problems associated with creating and/or receiving subscriptions in the printing system.

Figure 5:
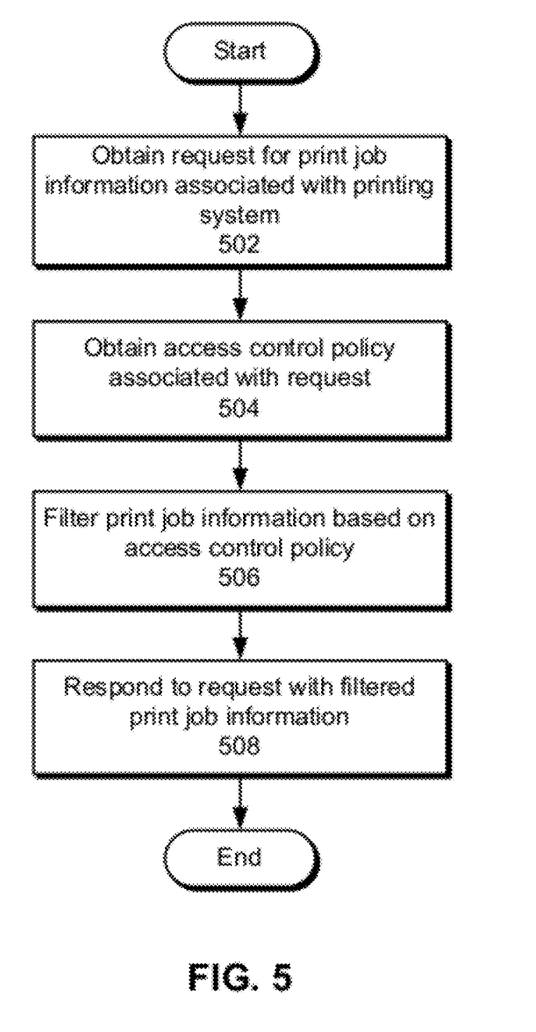
FIG. 5 shows a flowchart illustrating the process of managing use of a printing system in accordance with an embodiment.

FIG. 5 shows a flowchart illustrating the process of managing use of a printing system in accordance with an embodiment. In one or more embodiments, one or more of the steps may be omitted, repeated, and/or performed in a different order. Accordingly, the specific arrangement of steps shown in FIG. 5 should not be construed as limiting the scope of the technique.

Initially, a request for print job information associated with the printing system is obtained (operation 502). The print job information may include a name, a size, a number of pages, an owner, one or more job options, a time of creation, a time of processing, a time of completion, a state, a hold time, a job ID, and/or a destination.

Next, an access control policy associated with the request is obtained (operation 504). The access control policy may be obtained by verifying a user associated with the request and obtaining the access control policy as a set of permissions associated with the user. For example, the user may be verified by obtaining a username, UID, and/or password from the user. The access control policy may then be obtained based on a role (e.g., administrator, non-administrator) of the user. For example, the access control policy may be associated with unrestricted access to the print job information if the user is associated with an administrator role and restricted access to the print job information if the user is associated with a non-administrator role.

The print job information is then filtered based on the access control policy (operation 506). To filter the print job information, a set of restricted print job attributes may be obtained from the access control policy and excluded from the print job information. Finally, the request is responded to with the filtered print job information (operation 508). For example, the filtered print job information may be provided to the user to facilitate use of the printing system by the user without compromising the confidentiality of private and/or sensitive data in the print job information.

Figure 6:
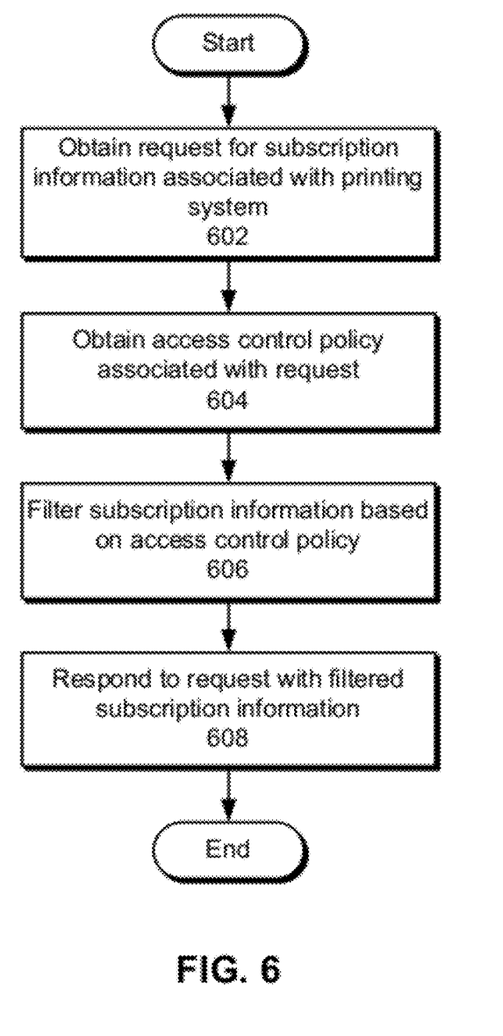
FIG. 6 shows a flowchart illustrating the process of managing use of a printing system in accordance with an embodiment.

FIG. 6 shows a flowchart illustrating the process of managing use of a printing system in accordance with an embodiment. In one or more embodiments, one or more of the steps may be omitted, repeated, and/or performed in a different order. Accordingly, the specific arrangement of steps shown in FIG. 6 should not be construed as limiting the scope of the technique.

First, a request for subscription information associated with the printing system is obtained (operation 602). The subscription information may contain a subscription ID, an owner, one or more event types, a poll method, a recipient, a creation time, a destination, one or more notification attributes, a preferred language, and/or a lease time. In addition, each of the event types may be associated with a printer, a print job, and/or a print server. For example, event types for printers may correspond to the addition, modification, deletion, stopping, starting, change in configuration, and/or change in state of one or more printers. Similarly, event types for print jobs may correspond to the creation, completion, cancellation, abortion, processing, change in configuration, and/or change in state of one or more print jobs. Finally, event types for print servers may include the starting, stopping, restarting, and/or auditing of one or more print servers.

Next, an access control policy associated with the request may be obtained (operation 604). The access control policy may be based on a username, UID, password, and/or role of a user from which the request was received. For example, the access control policy may be associated with unrestricted access to the subscription information if the role corresponds to an administrator role, while the access control policy may be associated with restricted access to the subscription information if the role corresponds to a non-administrator role.

The access control policy is then used to filter the subscription information (operation 606). For example, a set of restricted subscription attributes may be obtained from the access control policy and excluded from the subscription information. Finally, the filtered subscription information is used to respond to the request (operation 608). For example, the filtered subscription information may be provided to a non-administrator user to allow the user to troubleshoot his/her subscription problems in the printing system without revealing sensitive and/or private data related to the subscription preferences and/or monitoring behaviors of other users of the printing system. In other words, the filtered subscription information may facilitate information security in the printing system.

Figure 7:
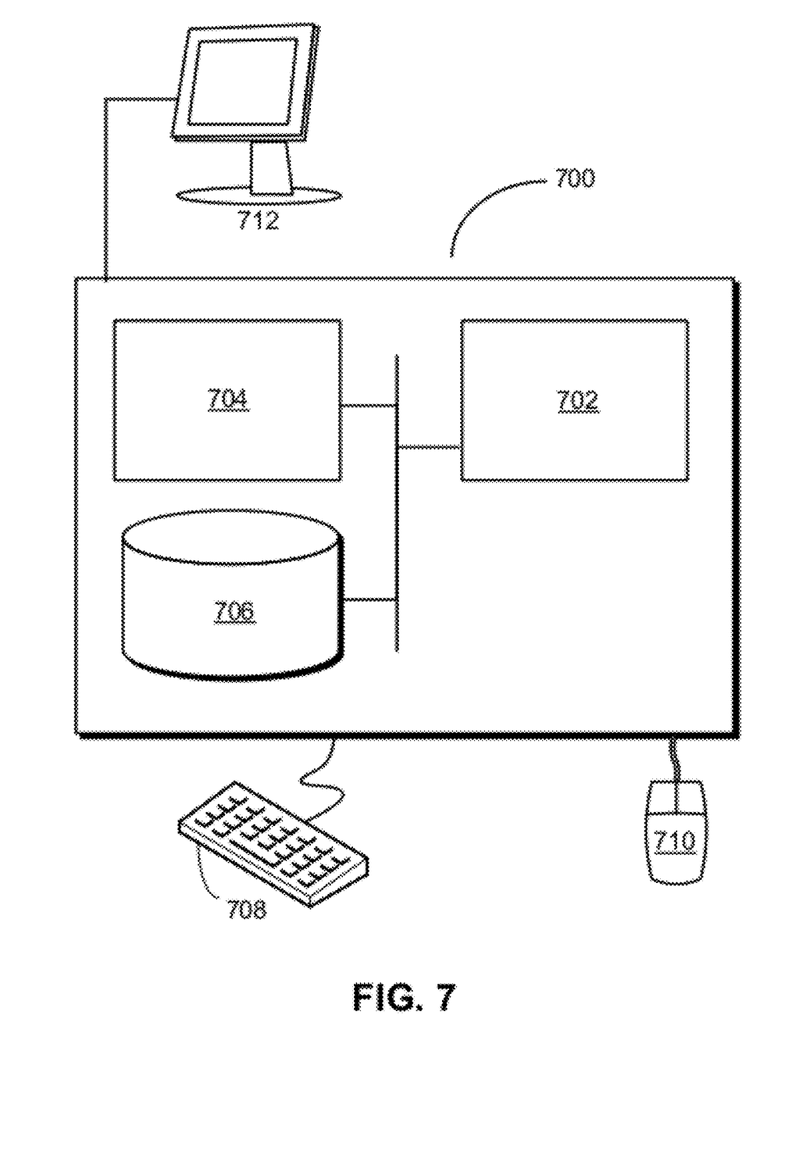
FIG. 7 shows a computer system in accordance with an embodiment.

FIG. 7 shows a computer system 700 in accordance with an embodiment. Computer system 700 may correspond to an apparatus that includes a processor 702, memory 704, storage 706, and/or other components found in electronic computing devices. Processor 702 may support parallel processing and/or multi-threaded operation with other processors in computer system 700. Computer system 700 may also include input/output (I/O) devices such as a keyboard 708, a mouse 710, and a display 712.

Computer system 700 may include functionality to execute various components of the present embodiments. In particular, computer system 700 may include an operating system (not shown) that coordinates the use of hardware and software resources on computer system 700, as well as one or more applications that perform specialized tasks for the user. To perform tasks for the user, applications may obtain the use of hardware resources on computer system 700 from the operating system, as well as interact with the user through a hardware and/or software framework provided by the operating system.

In one or more embodiments, computer system 700 provides a system for managing use of a printing system. The system may include a communication apparatus that receives a request for print job information associated with the printing system and/or subscription information associated with subscriptions to events in the printing system. The system may also include an access control apparatus that obtains an access control policy associated with the request and filters the print job and/or subscription information based on the access control policy. The communication apparatus may then respond to the request with the filtered print job and/or subscription information. The filtered print job and/or subscription information may thus facilitate information security in the printing system.

In addition, one or more components of computer system 700 may be remotely located and connected to the other components over a network. Portions of the present embodiments (e.g., communication apparatus, access control apparatus, etc.) may also be located on different nodes of a distributed system that implements the embodiments. For example, the present embodiments may be implemented using a cloud computing system that manages the use of a set of remote printers by a set of users.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for managing use of a printing system, comprising:
   obtaining, by one or more processors, from a computer memory, a request from a user account for subscription information associated with subscriptions to events in a printing system that includes at least one printer;
   obtaining, by the one or more processors, an access control policy associated with the user account;
   filtering, by the one or more processors, the subscription information based on the access control policy; and
   responding, by the one or more processors, to the request with the filtered subscription information.

2. The computer-implemented method of claim 1, wherein the act of obtaining the access control policy comprises:
   verifying the user account associated with the request; and
   obtaining the access control policy as a set of permissions associated with the user account.

3. The computer-implemented method of claim 2, wherein the act of verifying the user account comprises verifying at least one of a username, a user identifier (UID), a role, and a password.

4. The computer-implemented method of claim 3, wherein the access control policy is associated with unrestricted access to the subscription information when the role corresponds to an administrator role, and wherein the access control policy is associated with restricted access to the subscription information when the role corresponds to a non-administrator role.

5. The computer-implemented method of claim 1, wherein the act of filtering the subscription information comprises:
   obtaining a set of restricted subscription attributes from the access control policy; and
   excluding the restricted subscription attributes from the subscription information.

6. The computer-implemented method of claim 1, wherein the subscription information comprises at least one of a subscription identifier (ID), an owner, one or more event types, a poll method, a recipient, a creation time, a destination, one or more notification attributes, a preferred language, and a lease time.

7. The computer-implemented method of claim 6, wherein each of the one or more event types is associated with at least one of a printer, a print job, and a print server.

8. A system for managing use of a printing system, comprising:

an access control apparatus comprising one or more processors configured to:
  obtain an access control policy associated a request from a user account for subscription information associated with subscriptions to events in a printing system that includes one or more printers; and
  filter the subscription information based on the access control policy; and
a communication apparatus comprising one or more processors configured to:
  receive the request for the subscription information; and
  respond to the request with the filtered subscription information.

9. The system of claim 8, wherein the access control apparatus' configuration to obtain an access control policy comprises being configured to obtain an access control policy based on at least one of a username for the user, a user identifier (UID) for the user, a password for the user, and a role of the user.

10. The system of claim 9,
  wherein the access control policy is associated with unrestricted access to the subscription information when the role corresponds to an administrator role, and
  wherein the access control policy is associated with restricted access to the subscription information when the role corresponds to a non-administrator role.

11. The system of claim 8, wherein the access control apparatus' configuration to filter the subscription information comprises being configured to:
  obtain a set of restricted subscription attributes from the access control policy; and
  exclude the restricted subscription attributes from the subscription information.

12. The system of claim 8, wherein the subscription information comprises at least one of a subscription identifier (ID), an owner, one or more event types, a poll method, a recipient, a creation time, a destination, one or more notification attributes, a preferred language, and a lease time.

13. The system of claim 12, wherein each of the at least one event type is associated with at least one of a printer, a print job, and a print server.

14. A non-transitory computer-readable storage medium storing instructions that when executed by a computer cause the computer to:
  obtain a request from a user account for subscription information associated with subscriptions to events in a printing system that includes one or more printers;
  obtain an access control policy for the user account;
  filter the subscription information based on the access control policy; and
  respond to the request with the filtered subscription information.

15. The computer-readable storage medium of claim 14, wherein the instructions to cause the computer to obtain the access control policy comprise instructions to cause the computer to:
  verify the user account; and
  obtain the access control policy as a set of permissions associated with the user account.

16. The computer-readable storage medium of claim 14, wherein the instructions to cause the computer to filter comprise instructions to cause the computer to:
  obtain a set of restricted subscription attributes from the access control policy; and
  exclude the restricted subscription attributes from the subscription information.

* * * * *